United States Patent [19]
Takata et al.

[11] Patent Number: 5,682,308
[45] Date of Patent: Oct. 28, 1997

[54] CONTROLLING METHOD TO FOLLOW-UP TARGET VALUE

[75] Inventors: Koji Takata; Kazuhiro Kato; Yoichi Miyawaki, all of Itami, Japan

[73] Assignee: Sumitomo Electric Industries, Ltd., Osaka, Japan

[21] Appl. No.: 172,395

[22] Filed: Dec. 23, 1993

[30]  Foreign Application Priority Data

Jan. 11, 1993 [JP]  Japan ................... 5-002549

[51] Int. Cl.⁶ ................... G05B 13/02
[52] U.S. Cl. ................... 364/148; 364/152; 364/166; 364/174
[58] Field of Search ................... 364/148–152, 364/140–143, 153, 160–166, 172–175

[56]  References Cited

U.S. PATENT DOCUMENTS

| | | | |
|---|---|---|---|
| 5,119,287 | 6/1992 | Nakamura et al. | 364/148 |
| 5,150,289 | 9/1992 | Badauas | 364/148 |
| 5,247,432 | 9/1993 | Ueda | 364/148 |
| 5,285,377 | 2/1994 | Sugasaka et al. | 364/148 |

*Primary Examiner*—Paul P. Gordon
*Assistant Examiner*—Thomas Brown
*Attorney, Agent, or Firm*—Greenblum & Bernstein, P.L.C.

[57]  ABSTRACT

A controlling method in a controlling system which changes the controlled physical quantity to follow up a target value smoothly to maximum. The control system includes a target value setting portion for setting a target value Y of the controlled physical quantity and a desired variation operation portion for obtaining a desired variation dWx of the controlled physical quantity in accordance with the target value Y. Further, a control demand output portion for outputting a control demand value Z in accordance with the desired variation dXw and a controlled apparatus which changes the controlled physical quantity in accordance with the control demand value Z are provided.

18 Claims, 2 Drawing Sheets

CONTROLLING METHOD TO FOLLOW-UP TARGET VALUE

BACKGROUND OF THE INVENTION

The present invention generally relates to a controlling method for having a desired target value followed up in an automatic control system.

In a controlling system of digits to be measured, calculated, outputted for each control cycle, a control demand value obtained by the calculation in accordance with a present value of a certain controlled physical quantity and a target value given by some means are given to a controlled apparatus so as to operate the controlled apparatus in accordance with the control demand value to cause the controlled physical quantity to change in order to follow up the target value. This controlling operation is widely effected in an automatic control system.

In this type of controlling method, it is a primary object to smoothly change the controlled physical quantity to a target value. But, a long time is often required to reach the target value. In addition, it is often impossible to follow up the target value because of a hunting operation.

SUMMARY OF THE INVENTION

Accordingly, the present invention has been developed with a view to substantially eliminating the above discussed drawbacks inherent in the prior art and for its essential object to provide an improved target value follow-up controlling method.

Another important object of the present invention is to provide an improved target value follow-up controlling method capable of causing the controlled physical quantity to change as smoothly as possible in following up the target value.

In accomplishing these and other objects, according to one preferred embodiment of the present invention, in a control system comprising a target value setting portion (1) for setting a target value Y of the controlled physical quantity, a desired variation operation portion (2) for obtaining a desired variation dXw of the controlled physical quantity in accordance with a target value Y and a present value X of the controlled physical quantity, a control demand output portion (3) for outputting a control demand value Z in accordance with the desired variation dXw so as to change the controlled physical quantity X by the function of the controlled apparatus (4) in accordance with the control demand value Z, a first invention of the present invention is characterized in that the control demand output portion (3) is adapted to output $Z=f^{-1}$ (dXw) in accordance with inverse function $Z=f^{-1}$ (dX) of a characteristic function $dX=f(Z)$ which is a function describing the relation between a control demand value Z and a variation dX of the controlled physical quantity to be realized through a controlled apparatus (4) due to the outputting of a control demand value Z during one control cycle.

In a control system comprising a target value setting portion (1) for setting a target value Y of the controlled physical quantity, a desired variation operation portion (2) for obtaining a desired variation dXw of the controlled physical quantity in accordance with a target value Y and a present value X of the controlled physical quantity, a control demand output portion (3) for outputting a control demand value Z in accordance with the desired variation dXw so as to change the controlled physical quantity X by the function of the controlled apparatus (4) in accordance with the control demand value Z, a second invention of the present invention is characterized in that the desired variation operation portion (2) is adapted to calculate, as a total of values, the desire variation dwx where:

$$dXw = dY \times m + (Y_{-1} - X) \times n \quad (0 \leq m \leq 1, 0 \leq n \leq 1)$$

where total deviation (Y–X) is divided into new deviation dY and existing deviation $(Y_{-1} - X)$, original deviation disappearing speeds m, n are multiplied by each when a target value of the next cycle obtained by the present cycle is Y, a target value of the present cycle obtained by the previous cycle is $Y_{-1}$, a variation dY of the target value is made $Y - Y_{-1}$.

Assume that the controlled physical quantity measured value of the present cycle is X, the next cycle target value of the controlled physical quantity is Y, a control demand value with respect to the controlled apparatus (4) is Z.

The variation per each control cycle is expressed by d.

In a first invention of the present invention, a control demand value Z to be outputted at the present cycle $$Z = f^{-1}(dXw, P)$$

where the desired value of a variation dX per cycle of the controlled physical quantity is made dXw. The $f^{-1}$ is an inverse function of a function $dX = f(Z, P)$ describing the relation between a control demand value Z during one cycle and a variation dX to appear in the controlled physical quantity through a controlled apparatus (4) having Z as a result outputted. The f can be considered an expectation value with respect to distribution. The P shows a parameter collectively when the reaction of the controlled apparatus (4) changes with respect to the same Z. For example, the P can be X or dX, the other physical quantity capable of measuring operation for reference, or a combination of them. Assume that the P is included in the function f if necessary, and it can be made as simple as $dX = f(Z)$, $Z = f^{-1}$ (dXw).

The function f is to previously suppose a proper shape as described in the claim 2 so that a constant in it can be learned from the actual value.

A second invention of the present invention can obtain a desired variation dXw as $$dXw = dY \times m + (Y_{-1} - x) \times n \quad (0 \leq m \leq 1, 0 \leq n \leq 1)$$

Since Y is a target value of the next cycle calculated by the present cycle, $Y_{-1} = Y - dY$ shows the target value of the present cycle calculated by the previous cycle. Namely, the total deviation (Y–X) can be divided into the new deviation dY and the existing deviation (Y–dY–X). A recommended shape of the function f means the respective independent setting of disappearing speed coefficients of the existing deviation and the disappearing speed of the new deviation.

The above described coefficients m, n discriminate, as described in the claims 4 through 7, situations by the sign of dY, (Y–X) and the other methods, and can be set in accordance with the situation, and the control of the coefficients m, n has an effect of especially restraining the hunting operation.

BRIEF DESCRIPTION OF THE DRAWINGS

These and other objects and features of the present invention will become apparent from the following description of the preferred embodiments thereof with reference to the accompanying drawings, in which.

DETAILED DESCRIPTION OF THE INVENTION

Figure 1:
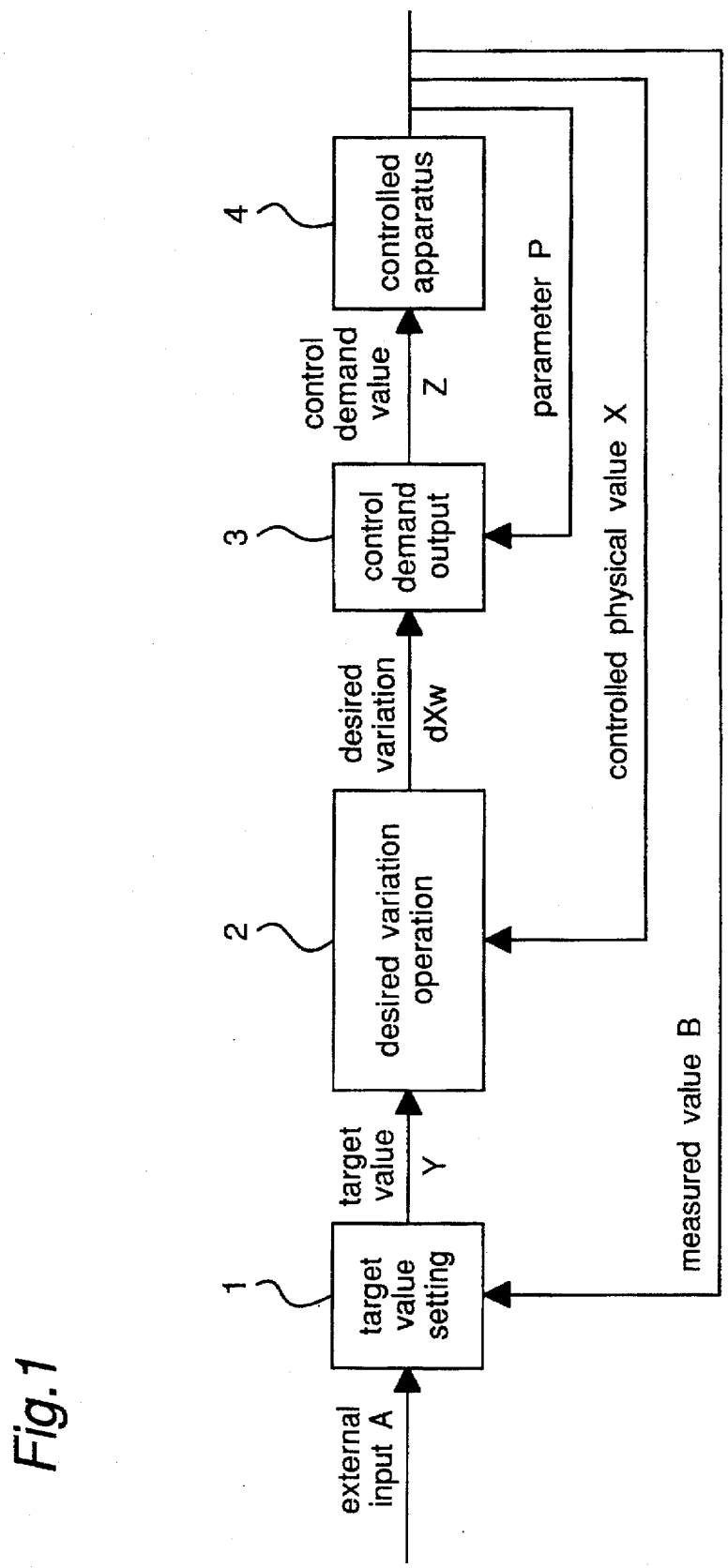
FIG. 1 is a diagram showing a control system to which a controlling method of the present invention is applied.
Figure 2:
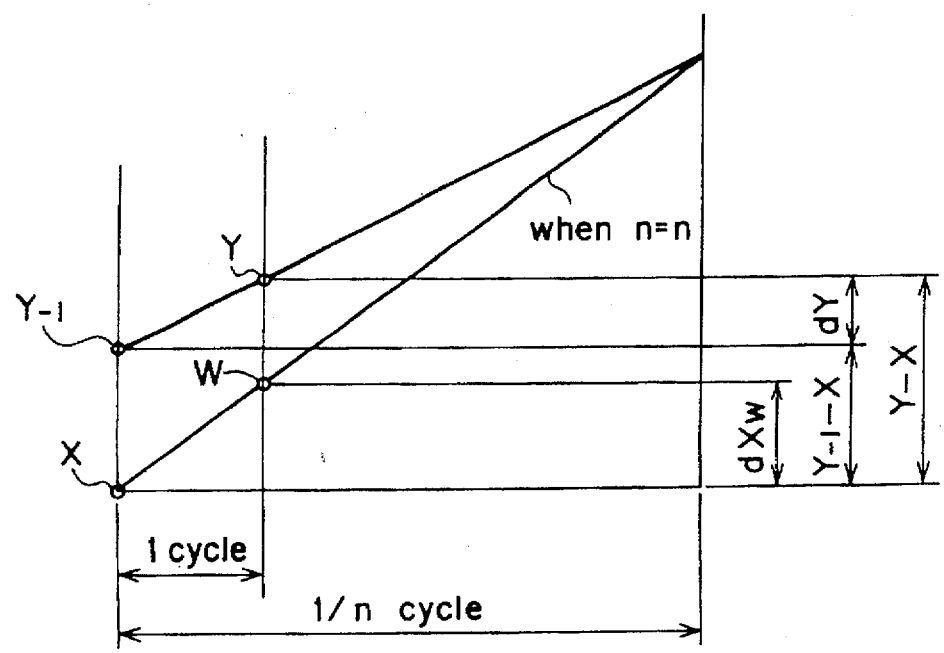
FIG. 2 is a time chart showing the following to a target value of the present value.
Figure 3:
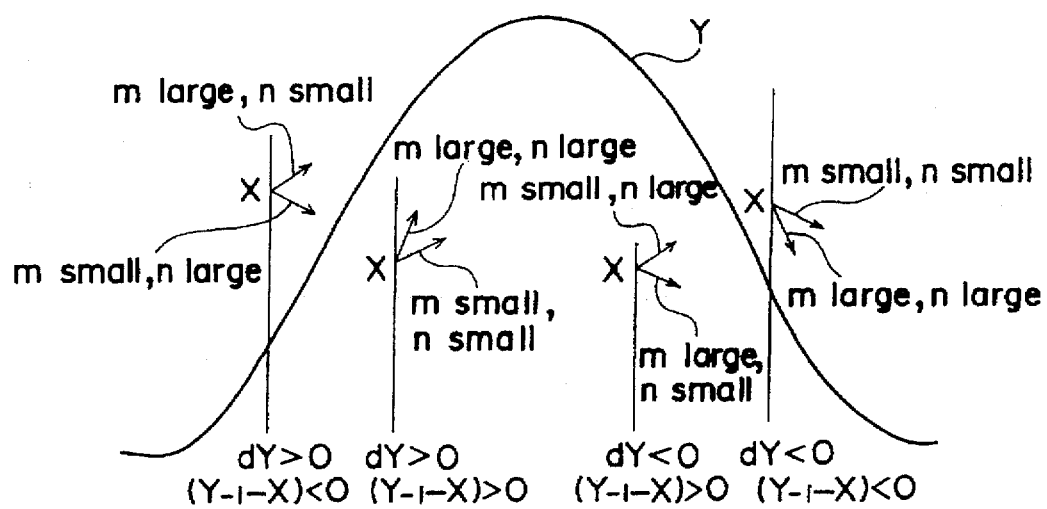
FIG. 3 is a time chart showing the control operation of an apparatus of FIG. 2.

Before the description of the present invention proceeds, it is to be noted that like parts are designated by like reference numerals throughout the accompanying drawings.

FIG. 1 shows a control system to which the controlling method of the present invention is applied. Reference numeral 1 is a target value setting portion for calculating a target value Y in accordance with some measured value B and/or an external input A which reflects a control system condition. Reference numeral 2 is a desired variation operation portion for obtaining a desired variation dXw of the controlled physical quantity in accordance with the target value Y and a measured value X of the controlled physical quantity. Reference numeral 3 is a control demand output portion for outputting a control demand value Z in accordance with a desired variation dXw and a parameter P which reflects the condition of the control system. Reference numeral 4 is a controlled apparatus to be operated in accordance with a control demand value Z.

The control demand output portion 3 is defined as an inverse function $Z=f^{-1}(dX, P)$, of a characteristic function of the controlled apparatus (4) $dX=f(Z, P)$, between a control demand value Z and a variation dX of the controlled physical quantity to be realized through a controlled apparatus (4) due to outputting of a control demand value Z during one control cycle. When the desired variation dXw is inputted to the control demand output portion (3), $Z=f^{-1}(dXw, P)$ is outputted. The function f can be considered an expectation value with respect to distribution having certain dispersion.

A parameter P summarily shows a parameter in a case where the reaction of a controlled apparatus (4) changes with respect to the same control demand value Z. For example, the P may be X or dX, the other physical quantity to be measured for reference, or a combination of them.

The function f is to previously suppose a proper shape so that a constant in it can be learned from actual values. When the function f is supposed as $dX=a \times Z+b$ as the simplest example, a constant b only can be learned with a constant a being fixed. It is considered for the b to be slowly followed towards $(dX-a \times Z)$ calculated from each actual result values Z and dX. The Z with respect to dXw is obtained as $Z=(dXw-b)/a$ with the use of learned b in accordance with the inverse function f of this case.

When the desired variation dXw exceeds a limit of the control performance of the controlled apparatus (4), the dXw enters a region of the function $f^{-1}$ not defined. In this case, a maximum value is given immediately as the Z and the X is left from the Y. A deal with respect to the problem is given by the following control.

A desired variation operation portion 2 is taken into consideration.

$dXw=W-X$ shows the desired variation to be expected by the next cycle, wherein the present value is X, Y is a target value of the next cycle, W is a desired value showing how far X is approached in the next cycle. $Y_{-1}$ is a target value with respect to the present cycle calculated by the previous cycle and $dY=Y-Y_{-1}$ is a variation of a target value. Assume that $dXw=(Y-X) \times n$, because the (Y-X) is a deviation between a target value and the present value. This means that the deviation is intended to disappear by 1/n cycle.

$$Y-X=dY+(Y-dY-X)=dY+(Y_{-1}-X)$$

Assume that $dXw=dY \times m+(Y_{-1}-X) \times n$ $(0 \leq m \leq 1, 0 \leq n \leq 1)$ and it is intended to disappear with 1/m cycle in 1/m cycle in the former, and 1/n cycle in the latter with the total deviation value (Y-X) being divided between the new deviation dY and the existing deviation $(Y_{-1}-X)$.

The following advantage is provided by the separation between the disappearing speed of the new deviation and the disappearing speed of the existing deviation.

When the sign of the dY is different from that of $(Y_{-1}-X)$, it is found from the combination of m, n that the sign of dXw can be inverted. This suggests from the situation that the control characteristics can be changed considerably depends upon a situation by only change in m, n.

When m, n are made larger (close to 1), weaker noises, instead of faster following, are provided. When the m, n are made smaller (close to 0), it becomes opposite. In addition to the above described common characteristics, there is a considerable effect in restraining the hunting that the phase delay of the X with respect to Y is reduced, when the m/n is made larger.

From the fact, it is recommended that the phase be considered seriously, namely, m/n be relatively made larger, at a time when (dY>0) and (Y or $Y_{-1}$ be <X or $\leq$X, namely, Y is smaller than X) or (dY<0) and (Y or $Y_{-1}$ be >X or $\geq$X, namely, Y is larger than X). At a time except for it, the following property is considered seriously, namely, m/n is relatively made small.

In further detailed control, the sign of the variation ddY of the dY can be also considered. The phase should be considered most seriously at a time when (dY>0) and (Y is smaller than X) and (ddY>0) or (dY<0) and (Y is larger than X) and (ddY<0)

the m/n can be set into two stages, three stages or four stages from three sign relation. At a time dY=0, following property is considered seriously, namely, m/n is required to be kept relatively smaller (in this case, it means that n is substantially made sufficiently large, because dY×m=0)

Even except for it, the division is effected in accordance with the characteristics of the control system, and m and n can be switched in value in accordance with the case.

When the noise of Y is relatively small, m can be made larger.

When the noise of Y is sufficiently small practically, m=1 is desirable. If m=1, $X=Y_{-1}$ in dY=const, namely, when the change speed of the Y is constant, the following operation can be effected without constant deviation (needless to say, the controlling operation is restricted to time where dY is within the performance range of the controlled apparatus).

Noises of X may become large especially when the Z changes suddenly. The n often cannot be made too large except when the following property is not considered seriously. When such fear exists, dXw including noises is calculated, thereafter a filter may applied upon dXw so as to calculate Z. The calculation is effected till Z, with the noises being included as they are, and thereafter, the filter processing operation is effected. The outputting operation can be effected. The relation among the above described noise and m, n show the relative tendency strictly.

As is clear from the foregoing description, the present invention is especially effective in a case where a target value is adapted to change in connection with the controlled physical quantity. For example, in a case where the capability of the controlled apparatus is lower than the dXw temporarily, if Y comes smaller after X is left later than Y because of dispersion or the like in the response of the controlled apparatus and thereafter. Namely, if dY becomes negative and, the X still tries to follow the Y, X outruns the Y, so that a hunting phenomenon is caused. It is known that a phenomenon, where X and Y outruns each other because of the shift in phase, is likely to be caused in a case where there is some cause and effect relationship between X and Y. According to the present invention, the control demand value Z can be made negative relatively earlier when the dY becomes negative, so that X is restrained from outrunning Y and so that a stable controlling operation can be restored.

Although the present invention has been fully described by way of example with reference to the accompanying drawings, it is to be noted here that various changes and modifications will be apparent to those skilled in the art. Therefore, unless otherwise such changes and modifications apart from the scope of the present invention, they should be construed as included therein.

What is claimed is:

1. In a control system including a target value setting portion for setting a target value Y of a controlled physical quantity, a desired variation operation portion for obtaining a desired variation dXw of the controlled physical quantity in accordance with the target value Y and a present value X of the controlled physical quantity, and a control demand output portion for outputting a control demand value Z in accordance with the desired variation dXw so as to change the present value X of the controlled physical quantity by the function of a controlled apparatus in accordance with the control demand value Z, a target value follow-up controlling method comprising a step of:

outputting $Z=f^{-1}(dXw)$ by the control demand output portion in accordance with an inverse function $Z=f^{-1}(dX)$ of a characteristic $dX=f(Z)$ which is a function describing the relation between the control demand value Z and a variation dX of the controlled physical quantity to be realized through the controlled apparatus due to the outputting of the control demand value Z during one control cycle.

2. A target value follow-up controlling method as defined in claim 1, further comprising a step of learning, correcting constants to be included in the function f by the values of Z and dX under control of the control demand output portion (3) in accordance with a predetermined function shape.

3. A target value follow-up controlling method as defined in claim 1, further comprising steps of having a variation dXw restrained, from $dXw_{-1}$ outputted with the previous cycle by restraining means, with respect to dXw calculated by the desired variation operation portion, and thereafter outputting it.

4. A target value follow-up controlling method as defined in claim 1, further comprising a step of having a variation dZ restrained, from $Z_{-1}$ outputted with the previous cycle by restraining means, with respect to Z calculated by the control demand output portion, and thereafter outputting it.

5. A target value follow-up controlling method as defined in claim 1, further comprising a step of having the target value setting portion adapted to set the target value Z depending at least upon the measured value relative to the controlled physical quantity.

6. A target value follow-up controlling method as defined in claim 1, said step of outputting $Z=f^{-1}(dXw)$ by the control demand output portion further comprising filtering out noises of the present value X after calculation of the desired variation dXw and prior to calculation of the control demand value Z.

7. A target value follow-up controlling method as defined in claim 1, wherein said step of outputting $Z=f^{-1}(dXw)$ by the control demand output portion further includes the step of changing said present value X of said controlled physical quantity in accordance with only one control demand value Z.

8. A target value follow-up controlling method as defined in claim 1, further comprising the steps of:

measuring said present value X of said controlled physical quantity; and obtaining said desired variation dXw based on said present value as an input for said control demand output portion to calculate said control demand value Z for said one control cycle.

9. In a control system including a target value setting portion for setting a target value Y of a controlled physical quantity, a desired variation operation portion for obtaining a desired variation dXw of the controlled physical quantity in accordance with the target value Y and a present value X of the controlled physical quantity, and a control demand output portion for outputting a control demand value Z in accordance with the desired variation dXw so as to change the present value X of the controlled physical quantity by the function of a controlled apparatus in accordance with the control demand value Z, a target value follow-up controlling method comprising a step of:

calculating the desired variation dXw of the controlled physical quantity by the desired variation operation portion as a total of values $$dXw=dY\times m+(Y_{-1}-X)\times n(0\leq m\leq 1,\ 0\leq n\leq 1);$$

where a total deviation (Y−X) is divided into a new deviation dY and an existing deviation ($Y_{-1}-X$), a new deviation disappearing speed coefficient, represented by m, and an existing deviation disappearing speed coefficient, represented by n, are multiplied by each respective deviation, a target value of the next cycle obtained by the present cycle is represented by Y, a target value of the present cycle obtained by the previous cycle is represented by $Y_{-1}$, and a variation, represented by dY, of the target value between next cycle target value and present cycle target value is represented by $Y-Y_{-1}$.

10. A target value follow-up controlling method as defined in claim 9, further comprising a step of having the deviation disappearing speed coefficients m,n changed in their values to reflect the condition of the control system.

11. A target value follow-up controlling method as defined in claim 10, further comprising a step of having a ratio m/n of the deviation disappearing speed coefficients m,n set relatively larger than zero by the desired variation operation portion when dY>0 and Y is smaller than X, or dY<0 and Y is larger than X.

12. A target value follow-up controlling method as defined in claim 11, further comprising a step of having a ratio m/n of the deviation disappearing speed coefficients m,n set largest by the desired variation operation portion in a case where dY>0, Y is smaller than X and ddY>0 or dY<0 and Y is larger than X and ddY<0, when the variation of dY is ddY.

13. A target value follow-up controlling method as defined in claim 9, further comprising a step of having the new deviation disappearing speed coefficient m set to m=1 by the desired variation operation portion.

14. A target value follow-up controlling method as defined in claim 9, wherein said step of calculating the desired variation dXw of the controlled physical quantity further includes the step of changing said present value X of said controlled physical quantity in accordance with only one control demand value Z.

15. A target value follow-up controlling method as defined in claim 9, further comprising the steps of:

measuring said present value X of said controlled physical quantity; and obtaining said desired variation dXw, based on said target value for said previous cycle and said target value for said present cycle, for input into said control demand output portion to calculate said control demand value Z for said present cycle.

16. In a control system including a target value setting portion for setting a target value Y of a controlled physical quantity, a desired variation operation portion for obtaining a desired variation dXw of the controlled physical quantity in accordance with the target value Y and a present value X of the controlled physical quantity, and a control demand output portion for outputting a control demand value Z in accordance with the desired variation dXw so as to change the present value X of the controlled physical quantity by the function of a controlled apparatus in accordance with the control demand value Z, a target value follow-up controlling method comprising steps of:

calculating the desired variation dXw of the controlled physical quantity by the desired variation operation portion as a total of values.

$$dXw = dY \times m + (Y_{-1} - X) \times n \ (0 \leq m \leq 1, \ 0 \leq n \leq 1);$$

where a total deviation (Y−X) is divided into a new deviation dY and an existing deviation (Y$_{-1}$−X), a new deviation disappearing speed coefficient, represented by m, and an existing deviation disappearing speed coefficient, represented by n, are multiplied by each deviation respectively, a target value of the next cycle obtained by the present cycle is represented by Y, a target value of the present cycle obtained by the previous cycle is represented by Y$_{-1}$, and a variation, represented by dY, of the target value is represented by Y−Y$_{-1}$;

filtering out noises of present value X; and calculating and outputting $Z = f^{-1}(dXw)$ by the control demand output portion in accordance with an inverse function $Z = f^{-1}(dX)$ of a characteristic $dX = f(Z)$ which is a function describing the relation between the control demand value Z and a variation dX of the controlled apparatus due to the outputting of the control demand value Z during one control cycle.

17. A target value follow-up controlling method as defined in claim 16, wherein said step of calculating and outputting $Z = f^{-1}(dXw)$ by the control demand output portion further includes the step of changing said present value X of said controlled physical quantity in accordance with only one control demand value Z.

18. A target value follow-up controlling method as defined in claim 16, further comprising the steps of:

measuring said present value X of said controlled physical quantity; and obtaining said desired variation dXw, based on said target value for said previous cycle and said target value for said present cycle, for input into said control demand output portion to calculate said control demand value Z for said one control cycle.

* * * * *